United States Patent
Mlinar

(10) Patent No.: US 10,841,617 B2
(45) Date of Patent: Nov. 17, 2020

(54) METHODS AND APPARATUS FOR SUCCESSIVE INTRA BLOCK PREDICTION

(71) Applicant: SEMICONDUCTOR COMPONENTS INDUSTRIES, LLC, Phoenix, AZ (US)

(72) Inventor: Marko Mlinar, Horjul (SI)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 95 days.

(21) Appl. No.: 16/201,253

(22) Filed: Nov. 27, 2018

(65) Prior Publication Data
US 2020/0169756 A1    May 28, 2020

(51) Int. Cl.
*H04N 19/61* (2014.01)
*H04N 19/18* (2014.01)
(Continued)

(52) U.S. Cl.
CPC .......... *H04N 19/61* (2014.11); *H04N 19/124* (2014.11); *H04N 19/176* (2014.11); *H04N 19/18* (2014.11)

(58) Field of Classification Search
CPC .... H04N 19/176; H04N 19/52; H04N 19/139; H04N 19/513; H04N 19/137; H04N 19/124; H04N 19/96; H04N 19/593; H04N 19/60; H04N 19/122; H04N 13/161; H04N 19/50; H04N 19/159; H04N 19/44; H04N 19/463; H04N 19/20; H04N 19/94; H04N 11/044; H04N 19/105; H04N 19/11; H04N 19/119; H04N 19/126; H04N 19/136; H04N 19/186; H04N 19/46; H04N 19/61; H04N 19/70; H04N 19/115; H04N 19/146; H04N 19/503; H04N 19/63; H04N 19/647; H04N 19/91; G06F 3/0655; G06T 9/004; H01L 27/14621
(Continued)

(56) References Cited

U.S. PATENT DOCUMENTS 5,321,776 A  6/1994 Shapiro
7,860,158 B2* 12/2010 Vetro ................. H04N 19/59
                                                    375/240

(Continued)

FOREIGN PATENT DOCUMENTS

WO    2014084674 A2    6/2014

OTHER PUBLICATIONS

Sole, et al., Transform Coefficient Coding in HEVC, IEEE Transactions on Circuits and Systems for Video Technology, Dec. 2012, pp. 1765-1777, vol. 22, No. 12, IEEE.

*Primary Examiner* — Aklilu K Woldemariam
(74) *Attorney, Agent, or Firm* — The Noblitt Group, PLLC; Hettie L. Haines

(57) ABSTRACT

Various embodiments of the present technology may comprise methods and apparatus for successive intra block prediction. Methods and apparatus for successive intra block prediction may comprise a matching decoder to generate data that replicates the internal state and/or the decompressed data at the decoder. The apparatus may further comprise a prediction module that utilizes the replicated data to make predictions. The apparatus may then utilize the predicted data and the original, input source data to determine a difference value and encode the difference value.

20 Claims, 6 Drawing Sheets

(51) Int. Cl.
  *H04N 19/124* (2014.01)
  *H04N 19/176* (2014.01)
(58) Field of Classification Search
  USPC ............... 382/233, 238, 162, 250, 251, 253
  See application file for complete search history.

(56) References Cited

U.S. PATENT DOCUMENTS

| | | | | |
|---|---|---|---|---|
| 8,885,711 B2* | 11/2014 | Kim | ............... | H04N 7/26941 375/240.12 |
| 8,908,761 B2* | 12/2014 | Nilsson | ............... | H04N 19/65 375/240.02 |
| 8,971,401 B2* | 3/2015 | Yamaguchi | ............... | H04N 19/11 375/240 |
| 2002/0001416 A1* | 1/2002 | Zhou | ............... | H04N 19/527 382/268 |
| 2002/0071611 A1 | 6/2002 | Rao et al. | | |
| 2002/0126774 A1* | 9/2002 | Harada | ............... | H04L 27/2647 375/340 |
| 2008/0187043 A1* | 8/2008 | Ahn | ............... | H04N 19/154 375/240.03 |
| 2009/0190829 A1* | 7/2009 | Suzuki | ............... | H04N 11/044 382/162 |
| 2009/0268810 A1 | 10/2009 | Dai | | |
| 2011/0142133 A1* | 6/2011 | Takahashi | ............... | G06N 3/10 375/240.16 |
| 2012/0281749 A1* | 11/2012 | Ikai | ............... | H04N 19/82 375/240.02 |
| 2013/0034166 A1* | 2/2013 | Shiodera | ............... | H04N 19/15 375/240.16 |
| 2013/0083856 A1 | 4/2013 | Rojals et al. | | |
| 2013/0089264 A1* | 4/2013 | Lim | ............... | H04N 19/50 382/233 |
| 2013/0089265 A1* | 4/2013 | Yie | ............... | G06T 9/004 382/238 |
| 2013/0114722 A1* | 5/2013 | Koyama | ............... | H04N 19/16 375/240.16 |
| 2014/0146888 A1* | 5/2014 | Takahashi | ............... | G06N 3/04 375/240.14 |
| 2014/0211851 A1* | 7/2014 | Miyoshi | ............... | H04N 19/52 375/240.15 |
| 2014/0247883 A1* | 9/2014 | Lee | ............... | H04N 19/463 19/463 |
| 2014/0254664 A1 | 9/2014 | Liu et al. | | |
| 2015/0010085 A1* | 1/2015 | Yie | ............... | H04N 19/119 375/240.16 |
| 2015/0049956 A1* | 2/2015 | Kato | ............... | H04N 19/50 382/233 |
| 2015/0071359 A1* | 3/2015 | Guo | ............... | H04N 19/18 375/240.18 |
| 2015/0078446 A1* | 3/2015 | Jun | ............... | H04N 19/503 375/240.12 |
| 2015/0139323 A1* | 5/2015 | Lee | ............... | H04N 19/521 375/240.16 |
| 2015/0319453 A1* | 11/2015 | Kang | ............... | H04N 19/187 375/240.12 |
| 2016/0165241 A1* | 6/2016 | Park | ............... | H04N 19/187 375/240.08 |
| 2016/0309145 A1 | 10/2016 | Sunwoo et al. | | |
| 2017/0238020 A1* | 8/2017 | Karczewicz | ............... | H04N 19/82 375/240.29 |
| 2018/0316934 A1* | 11/2018 | Nam | ............... | H04N 19/70 |
| 2018/0359468 A1* | 12/2018 | Seo | ............... | H04N 19/105 |

* cited by examiner

| | E1 | E2 | E3 | E4 | E5 | E6 | E7 | E8 | Z1 | Z2 | Z3 | Z4 | Z5~6 | Z7~10 | Z11~15 | E08 | T1 | T2 | T3 | T4 | T5 | T6 | T7 | T8 | M1 | M2 | M3 | M4 | M5 | M6 | M7 | M8 |
|---|---|---|---|---|---|---|---|---|---|---|---|---|---|---|---|---|---|---|---|---|---|---|---|---|---|---|---|---|---|---|---|---|
| E | 10% | 5% | 0% | 0% | 0% | 0% | 0% | 0% | 7% | 2% | 1% | 1% | 0% | 0% | 0% | 8% | 19% | 20% | 7% | 1% | 0% | 0% | 0% | 0% | 2% | 3% | 6% | 5% | 2% | 1% | 0% | 0% |
| Z | 51% | 1% | 0% | 0% | 0% | 0% | 0% | 0% | 0% | 0% | 0% | 0% | 0% | 0% | 0% | 0% | 35% | 4% | 0% | 0% | 0% | 0% | 0% | 0% | 4% | 3% | 1% | 0% | 0% | 0% | 0% | 0% |
| T | 20% | 0% | 0% | 0% | 0% | 0% | 0% | 0% | 23% | 12% | 5% | 2% | 1% | 0% | 0% | 0% | 38% | 0% | 0% | 0% | 0% | 0% | 0% | 0% | 0% | 0% | 0% | 0% | 0% | 0% | 0% | 0% |
| M | 0% | 2% | 0% | 0% | 0% | 0% | 0% | 0% | 13% | 2% | 0% | 0% | 0% | 0% | 0% | 0% | 0% | 17% | 2% | 0% | 0% | 0% | 0% | 0% | 23% | 25% | 11% | 3% | 0% | 0% | 0% | 0% |

METHODS AND APPARATUS FOR SUCCESSIVE INTRA BLOCK PREDICTION

BACKGROUND OF THE TECHNOLOGY

Many conventional encoders perform prediction by encoding or predicting using statistical properties of neighboring pixels or past predictions. This method, however, results in less accurate predictions for those pixels that are far away from already-encoded values. Many conventional methods may also require multiple prediction directions.

SUMMARY OF THE INVENTION

Various embodiments of the present technology may comprise methods and apparatus for successive intra block prediction. Methods and apparatus for successive intra block prediction may comprise a matching decoder to generate data that replicates the internal state and/or the decompressed data at the decoder. The apparatus may further comprise a prediction module that utilizes the replicated data to make predictions. The apparatus may then utilize the predicted data and the original, input source data to determine a difference value and encode the difference value.

BRIEF DESCRIPTION OF THE DRAWING FIGURES

A more complete understanding of the present technology may be derived by referring to the detailed description when considered in connection with the following illustrative figures. In the following figures, like reference numbers refer to similar elements and steps throughout the figures.

FIG. 4 is a chart illustrating various encodable symbols and example symbol probabilities in accordance with an embodiment of the present technology;

Figures 5A, 5B, 5C, 5D:
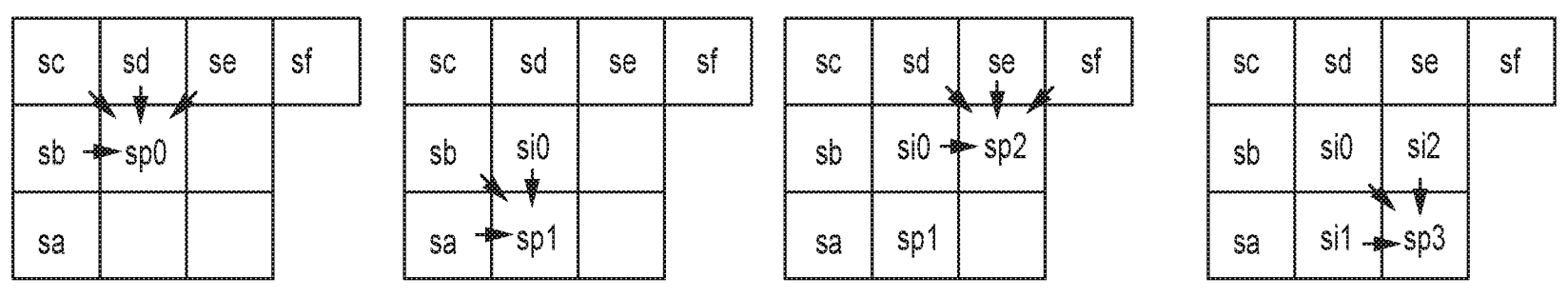

FIG. 5A representatively illustrates encoder prediction of a first image pixel in accordance with an exemplary embodiment of the present technology;

FIG. 5B representatively illustrates encoder prediction of a second image pixel in accordance with an exemplary embodiment of the present technology;

FIG. 5C representatively illustrates encoder prediction of a third image pixel in accordance with an exemplary embodiment of the present technology;

FIG. 5D representatively illustrates encoder prediction of a fourth image pixel in accordance with an exemplary embodiment of the present technology;

Figures 6A, 6B, 6C, 6D:
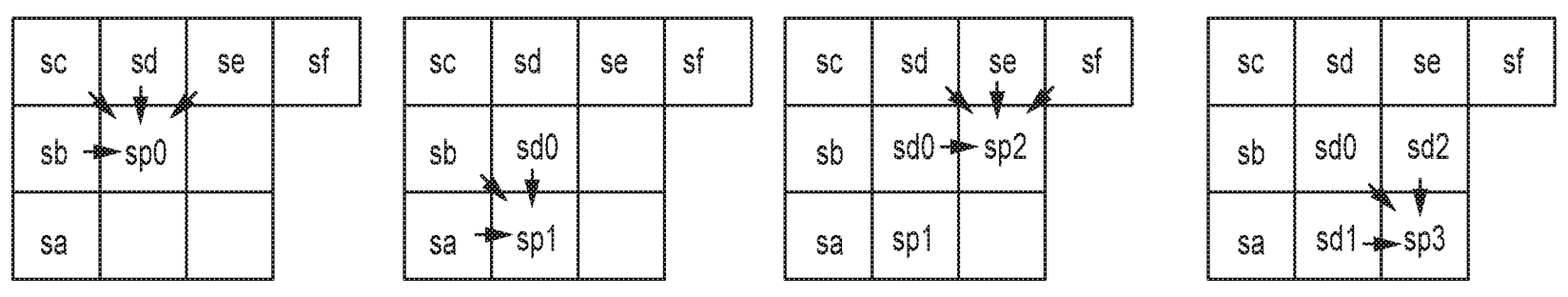

FIG. 6A representatively illustrates decoder prediction of a first image pixel in accordance with an exemplary embodiment of the present technology;

FIG. 6B representatively illustrates decoder prediction of a second image pixel in accordance with an exemplary embodiment of the present technology;

FIG. 6C representatively illustrates decoder prediction of a third image pixel in accordance with an exemplary embodiment of the present technology; and FIG. 6D representatively illustrates decoder prediction of a fourth image pixel in accordance with an exemplary embodiment of the present technology.

DETAILED DESCRIPTION OF EXEMPLARY EMBODIMENTS

The present technology may be described in terms of functional block components and various processing steps. Such functional blocks may be realized by any number of components configured to perform the specified functions and achieve the various results. For example, the present technology may employ various quantizers, transform algorithms, and the like, which may carry out a variety of functions. In addition, the present technology may be practiced in conjunction with any number of electronic systems, such as automotive, aviation, "smart devices," portables, and consumer electronics, and the systems described are merely exemplary applications for the technology. Further, the present technology may employ any number of conventional prediction techniques, quantization techniques, and transmission and/or storage techniques.

Methods and apparatus for transform coefficient encoding and decoding according to various aspects of the present technology may operate in conjunction with any suitable electronic system, such as an imaging system, an audio system, or any other system that compresses data and/or operates on compressed data.

Figure 1:
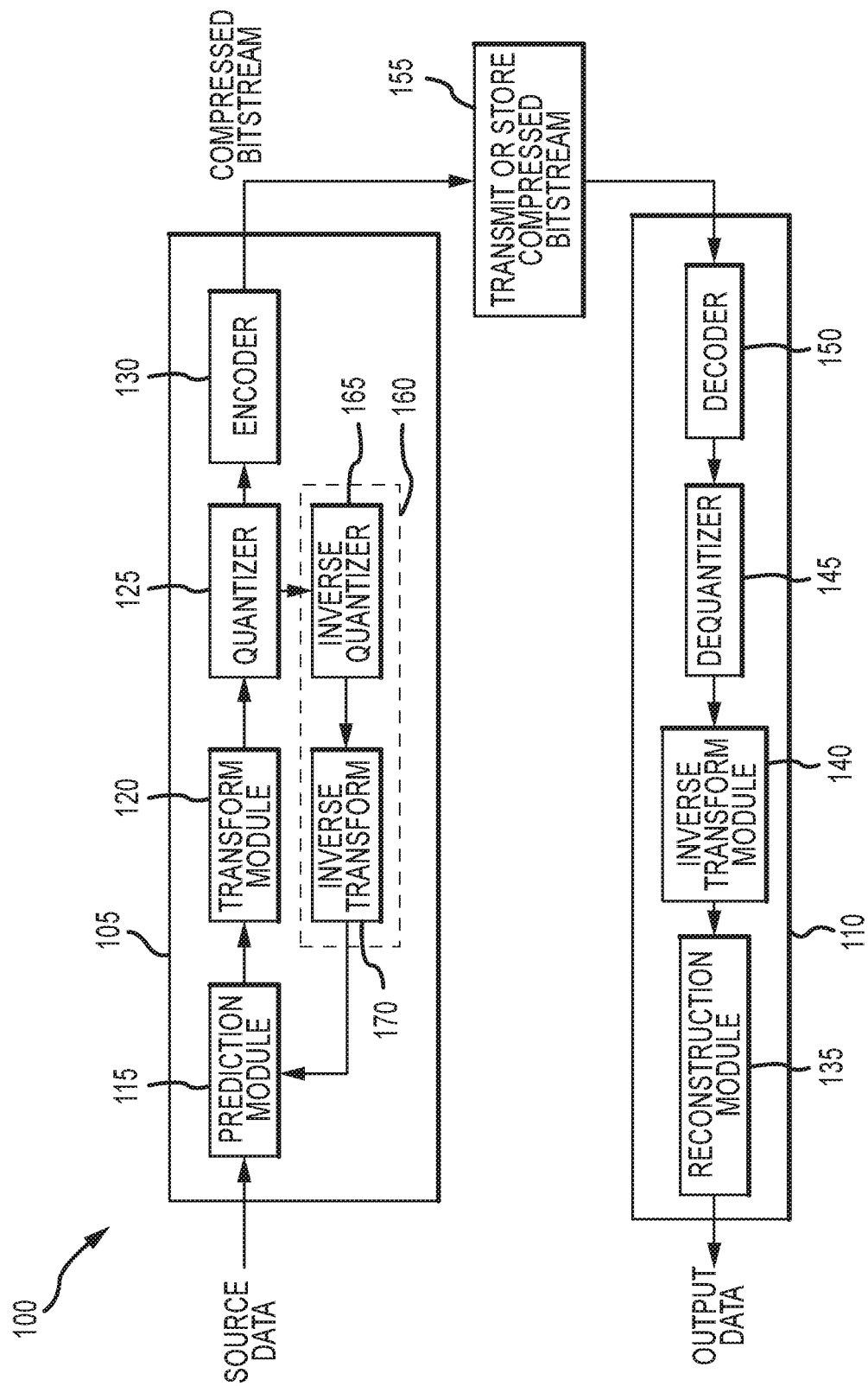
FIG. 1 is a block diagram of a system for encoding and decoding in accordance with an exemplary embodiment of the present technology.
Figure 2:
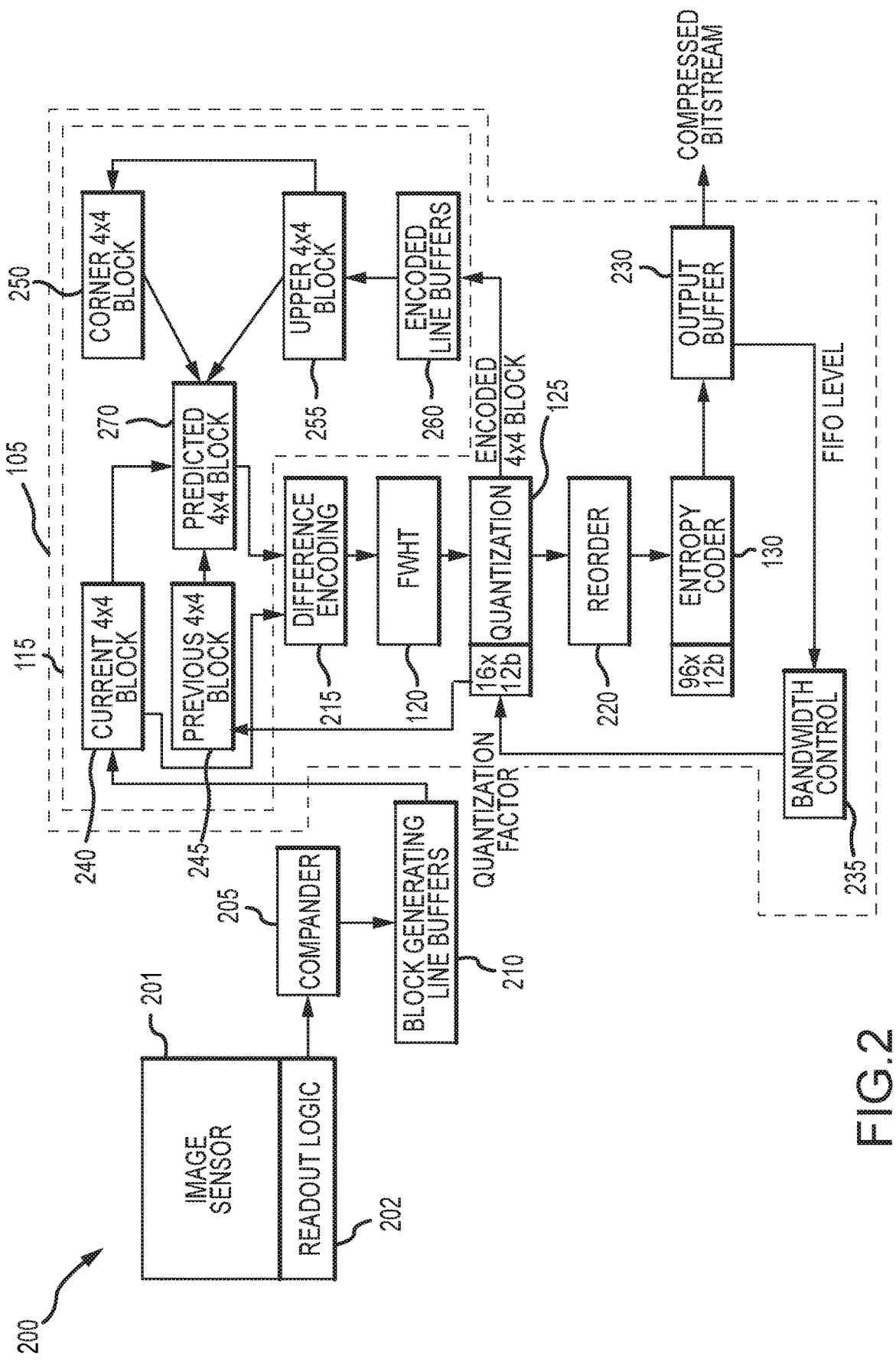
FIG. 2 is a block diagram of an imaging system in accordance with an exemplary embodiment of the present technology.

Referring to FIGS. 1 and 2, a system 100 according to various aspects of the present technology may be configured to encode source data, generate a compressed bitstream, decode the compressed bitstream, and generate output data that represents the source data. In an exemplary embodiment, the system 100 may comprise an encoder 105, an interface circuit 155, and a decoder 110 that operate together to compress, transmit, and reconstruct data.

An imaging system 200 may comprise an image sensor 201 equipped with a readout logic circuit 202, a compander 205 to improve the signal-to-noise ratio of a signal by compressing the range of amplitudes of the signal prior to transmission, and a first line buffer circuit 210 to generate blocks of data. For example, the image sensor 201 may generate one or more frames of image data, wherein each frame of image data comprises a plurality of pixel data. The compander 205 may receive and compress the frame of image data. The compander 205 may then transmit the compressed frame of image data to the first line buffer circuit 210, wherein the first line buffer circuit 210 divides the frame of image data into a plurality of blocks comprising a subset of pixels values from the plurality of pixel data, wherein each block comprises a plurality of sub-blocks. For example, each block may be described as a 2×2 block comprising 4 sub-blocks, a 4×4 block comprising 16 sub-blocks, etc, where each sub-block represents an individual pixel signal. The first line buffer circuit 210 may then transmit each block successively to the encoder 105 for further processing.

The encoder 105 may be configured to receive source data and convert the source data from one format or code to another for the purpose of standardization, speed, and/or compression. According to an exemplary embodiment, the encoder 105 may comprise a prediction module 115, a difference encoder, a transform module 120, a quantizer 125, an entropy encoding module 130, and a matching decoder 160.

According to an exemplary embodiment, the matching decoder 160 may be configured to generate data that replicates the internal state and/or the decompressed data at the decoder 110. The matching decoder 160 may comprise an inverse quantizer 165 to perform a dequantization function that is complementary to that performed by the quantizer 125 and an inverse transform module 170 to perform an inverse transform algorithm that is complementary to that performed by the transform module 120. The matching decoder 160 may be connected between the quantizer 125 and the prediction module 115. Accordingly, the matching decoder 160 may operate to dequantize and inversely transform the data from the quantizer 125, thus generating a replica of the decompressed data at the decoder 110 (i.e., replica data, replicated data). The matching decoder 160 may then transmit the replicated data to the prediction module 115.

The prediction module 115 may be configured to generate a predicted block 270 using already-encoded blocks (i.e., blocks that have been encoded in previous cycle) and data that has not been encoded. For example, the prediction module 115 may be configured to use one or more of a current block 240, a previous block 245, a corner block 250, and an upper block 255. The current block 240 may comprise current, original input data (e.g., pixel data) that has not been encoded (compressed) and the previous block 245 may comprise replicated data from the matching decoder 160. In other words, as the first line buffer circuit 210 transmits blocks of data to the encoder 105, a current (in time) block of data is used to form the current block 240 and replica data (via the matching decoder 160) is used to form the previous block 245. The corner block 250 comprises data that has already been encoded and later decoded (i.e., data has undergone difference encoding by the difference encoder 215, has been quantized by the quantizer 125, and has undergone reconstruction by a matching decoder 160). Similarly, the upper block 255 comprises decoded data that has already been encoded and later decoded (i.e., data has undergone difference encoding by the difference encoder 215, has been quantized by the quantizer 125, and has undergone reconstruction by the matching decoder 160). According to an exemplary embodiment, the prediction module 115 forms the predicted block 270 without using data from the decoder 110.

According to an exemplary embodiment, the prediction module 115 may receive the not-yet-encoded pixel data in the form of current block 240 and use the already-encoded pixel data to make predictions and form the predicted block 270. For example, the prediction module 115 may be configured to use the replicated data (forming the previous block 245) from the matching decoder 160, the corner block 250, and the upper block 255 to form the predicted block 270.

The encoder 105 may further comprise a difference encoder 215 (i.e., a delta encoder) configured to determine a difference between two data samples and transmit the difference, rather than an original data sample to the transform module 120. For example, the difference encoder 215 may be connected to and configured to receive the predicted block 270 and the current block 240, thereby generating a difference between data from the predicted block 270 and the original, not-yet-encoded pixel data from the current block 240. The difference encoder 215 may comprise any circuit and/or system suitable for calculating a difference, such as a circuit configured to perform a simple arithmetic subtraction, or any other suitable difference operation, such as calculating a ratio, and the like.

The transform module 120 may be configured to generate a transformed output by applying a transform algorithm to the predicted block 270, or the difference block in a case where the encoder 105 comprises the difference encoder 215. According to an exemplary embodiment, the transform module 120 is configured to apply a fast Walsh-Hadamard transform (FWHT) to the predicted block 270 or the difference block from the difference encoder 215. The transform module 120 may be realized by hardware, software, or a combination thereof.

The quantizer 125 maps input values from a set of values to an output value from a finite, smaller set of values. The quantizer 125 may be connected to the transform module 120 and configured to receive the transformed output. The quantizer 125 may then map the transformed output to a quantized output. The quantizer 125 may comprise any circuit and/or system suitable for performing a quantization function.

According to an exemplary embodiment, the encoder 105 may further comprise encoded line buffers 260. The encoded line buffers 260 may be connected to an output terminal of the quantizer 125 and configured to use the quantized output to form the upper block 255 and the corner block 250.

The encoder 105 may further comprise a reorder module 220 configured to rearrange the quantized outputs and generate an ordered set (e.g., a vector) of quantized outputs, wherein the quantized outputs are reordered in ascending order. The quantized outputs may be referred to as a plurality of quantized coefficients. The reorder module 220 may be connected to an output of the quantizer 125 and receive the quantized outputs.

The entropy encoder 130 converts the ordered set (i.e., plurality of quantized coefficients) into another domain which represents each quantized coefficient a smaller number of bits. In general, the entropy encoder 130 maps the values of the quantized coefficients to a stream of bits by utilizing their statistical properties. Some transform coefficients may be quantized to zero and the values of the non-zero coefficients are coded using a coding scheme, such as a variable-length coding (e.g., Huffman coding) or arithmetic coding. According to an exemplary embodiment, the entropy encoder 130 may generate a compressed bitstream using a single table of codes.

According to an exemplary embodiment, the entropy encoder 130 may represent each quantized coefficient from the plurality of quantized coefficients as a symbol, wherein the symbol comprises a context, a magnitude (i.e., an exponent), and a mantissa. The symbol may further comprise a sign when the quantized coefficient is a non-zero value. The context in this case is a 'next' context.

The entropy encoder 130 may use the magnitude to define the length of the encoded mantissa to form the $i^{th}$ coefficient: $C_i = (-1)^{sign} * 2^{magnitude} *$ mantissa. In the case of a quantized coefficient having a zero value, the entropy encoder 130 represents the number of consecutive zeros as a symbol. Therefore, the symbol for a quantized coefficient with a zero value comprises a context, the total number of zeros ('zero_count_magnitude'), and the number of zeros of the mantissa ('zero_count_mantissa'). The context in this case is a 'next' context. The zero coefficient is described by: $C_{i(i+n-1)} = 0$, where $n = 2^{zero\_count\_magnitude} *$ zero_count_mantissa.

The number of contexts may be selected according to the particular application, and it may be desired to keep the number of contexts as low as possible. According to an exemplary embodiment, the entropy encoder may comprise the four distinct contexts: a first context, a second context, a third context, and a fourth context. The first context may be a starting context and be associated with the first coefficient from the plurality of quantized coefficients. The second context may be associated with a last coefficient from the plurality of quantized coefficients with a magnitude of zero. The third context may be associated with a last coefficient from the plurality of quantized coefficients with a magnitude of one. The fourth context may be a default context.

The entropy encoder 130 may then encode the symbol. In order to reduce the number of symbols, the quantized coefficient may be represented using the magnitude and the mantissa, wherein the sign and the mantissa are encoded separately. For example, and referring to FIG. 4, the entropy encoder 130 may comprise a look-up table containing possible symbols (e.g., E1:E8, Z1:EOB, T1:T8, and M1:M8) according to a statistical probability for each possible symbol, a 'currently-active' context, which is one of the four distinct contexts, and a 'next' context, which is the context that immediately follows the 'currently-active' context.

The entropy encoder 130 may be configured to encode the symbol using the look-up table. For example, the look-up table may comprise Huffman codes. The entropy encoder 130 may be configured to encode the symbol using a subset of the Huffman codes, wherein the subset is determined based on the 'currently active' context. Accordingly, each quantized coefficient may be encoded using a single look-up table based on the 'currently-active' context, the 'next' context, and the magnitude.

According to an exemplary embodiment, the entropy encoder 130 may further be configured to count the number of zeros and the number of ones in the plurality of quantized coefficients using a run-length encoding (RLE) algorithm.

The encoder 105 may further comprise an output buffer 230 configured to temporarily hold data. For example, the output buffer 230 may be connected to and configured to receive a compressed bitstream from the entropy encoder 130. The output buffer 230 may temporarily hold the compressed bitstream before transmitting it to the interface 155.

The encoder 105 may further comprise a bandwidth control circuit 235 configured to selectively increase or decrease the bandwidth of the compressed bitstream. For example, the bandwidth control circuit 235 may increase the bandwidth if the desired quality decreases below a set threshold, and may decrease the bandwidth if the bandwidth exceeds transmission or storage capabilities of the system 100.

The interface circuit 155 transmits data from a transmitting device to a receiving device. For example, the interface circuit 155 may be connected to an output terminal of the encoder 105 and/or the encoder module 130 and receive the compressed bitstream. The interface circuit 155 may be further connected to an input terminal of the decoder 110 and configured to transmit the compressed bitstream to the decoder 110 and/or the decoding module 150. According to an exemplary embodiment, the interface circuit 155 comprises a mobile industry processor interface (MIPI) that is a bi-direction signaling protocol to transmit data between the imaging system 200 and a host processor (not shown), which contains the decoder 110, using a MIPI D-PHY serial bus.

The decoder 110 may be configured to perform various complementary processes of the encoder 105, such as decoding, dequantization, inverse transform, and reconstruction. For example, the decoder 110 may comprise a decoding module 150 to receive the compressed bitstream and decode/decompress the bitstream, a dequantizer 145 to receive and dequantize the decoded bitstream, an inverse transform module 140 to receive and perform an inverse transform on the dequantized data, and an reconstruction module 135 to receive and reconstruct the transformed data and generate output data that represents the source data.

The decoder 110 may be implemented in a host processor or any suitable host device, such as a device for displaying images and/or video.

Figure 3:
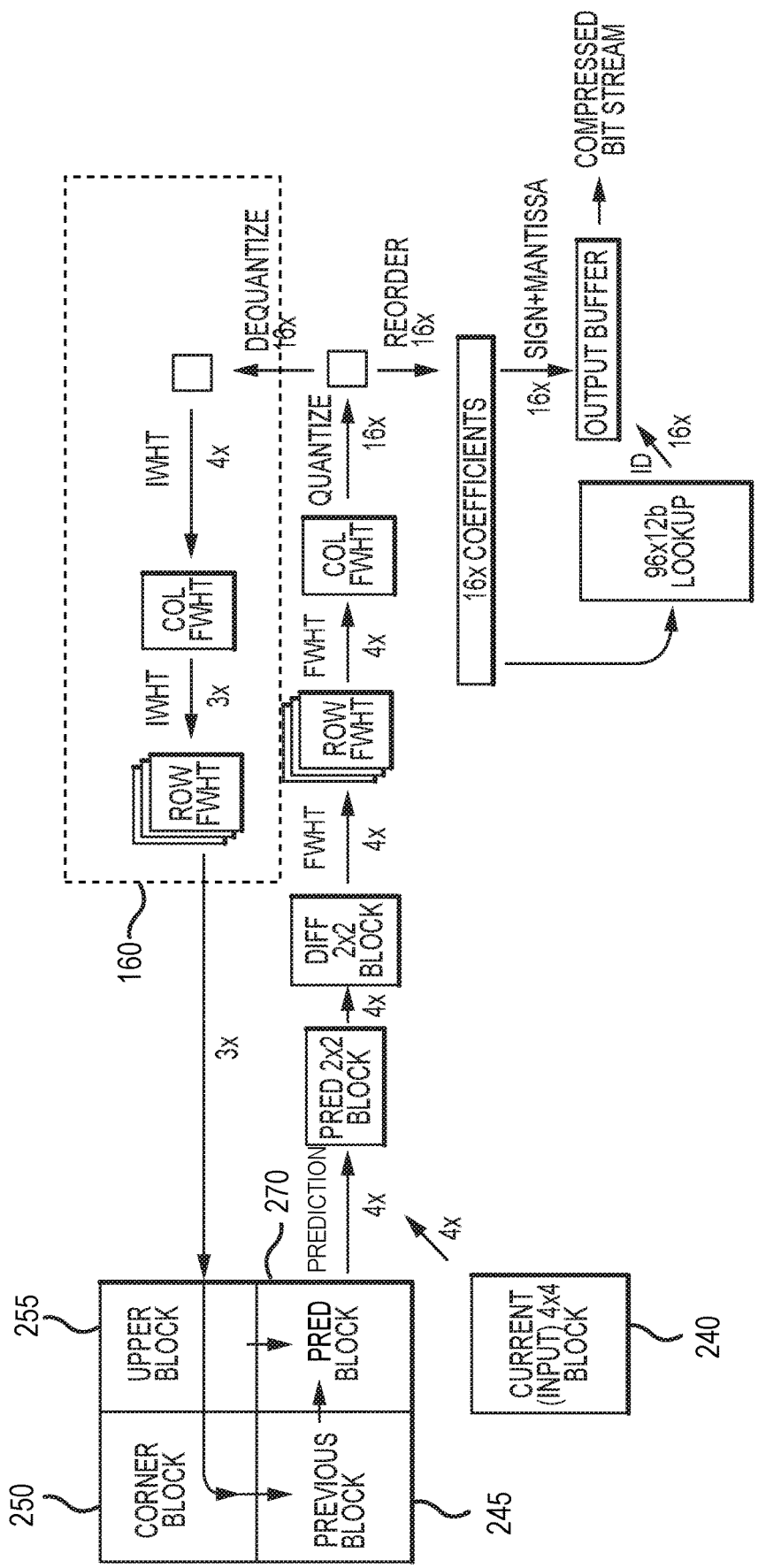
FIG. 3 is a flow diagram for encoding image data in accordance with an exemplary embodiment of the present technology.

According to an exemplary embodiment, and referring to FIGS. 1 and 3, the system 100 generates a frame of image data with the image sensor 201, divides the frame of image data into a plurality of blocks using the first line buffer circuit 210, and encodes the pixel data with the encoder 105. The encoder 105 generates the predicted block 245 using at least one of the corner block 250, the upper block 255, the previous block. The encoder 105 then performs difference encoding with the difference encoder 215 by computing a difference of the values in the current block 240 and the corresponding original, not-yet-encoded pixel data. The encoder 105 then transforms the difference block using FWHT for each row and each column of the block. The encoder then quantizes the transformed block (comprising transformed coefficients) using the transform module 120. The encoder 105 then reorders the quantized coefficients. The quantized coefficient may be represented by a symbol and the encoder 105 uses the look-up table to code symbol. The encoded symbol is then transmitted as a compressed bitstream to the output buffer 230, wherein the output buffer 230 transmits the compressed bitstream to the interface 155 and/or the decoder 110. The decoder 110 then performs complementary functions to construct the output data, which represents the source data.

The system 100 may comprise the interface 155 to store and/or transmit the compressed bitstream. The system 100 further decodes the compressed bitstream to generate output data that represents the source data using the decoder 110. The decoder 110 expands the compressed bitstream using the decoding module 150, dequantized the data using the dequantizer 145, performs inverse transformation using the inverse transform module 140, and reconstructs the data using the reconstruction module 135.

According to an exemplary embodiment, and referring to FIGS. 3, 5A-D, the encoder 130 uses the replica data comprising replica values from the matching decoder 160 to make predictions. For example, the encoder 105 may receive the source data, for example the pixel data, wherein the prediction module 115 receives the source data and performs intra block prediction comprising generating a first predicted value using a previously-predicted sub-block and generating a second predicted value using the previously-predicted sub-block and a replica value. For example, a first predicted value (e.g., sp0) is predicted using previously-predicted values (e.g., sb, sc, sd, se) (FIG. 5A). The encoder 105 then replaces the first predicted value (sp0) with a first replica value (si0), and the encoder 105 then predicts a second predicted value (e.g., sp1) using the first replica value (si0) and the previously-predicted values (e.g., sa, sb) (FIG. 5B). The encoder 105 then predicts a third predicted value (e.g., sp2) using previously-predicted values (e.g., sd, se, sf) and the first replica value (si0) (FIG. 5C). The encoder 105 then replaces the second predicted value (sp1) and the third predicted value (sp2) with a second replica value (si1) and a third replica value (si2), respectively. The encoder 105 then predicts a fourth predicted value (e.g., sp3) using only the replica values (e.g., si0, si1, si2) (FIG. 5D). This method reduces the need for multiple prediction directions, as a single direction can be used, and provides a more accurate prediction.

The encoder 105 then performs difference encoding using the difference encoder 215. For example, the difference encoder 215 then receives the values in the predicted block 270, as formed above, and the original, not-yet-encoded pixel values. The difference encoder 215 then computes the difference between the predicted values and the original, not-yet-encoded values and encodes the difference value. Each predicted value in the predicted block is subtracted from an original, not-yet-encoded value having a same coordinate location within the frame of image data. Since the predicted values are more accurate, the encoded difference value is also more accurate than conventional methods.

According to an exemplary embodiment, and referring to FIGS. 1 and 6A-6D, the decoder 110 operates to perform complementary functions, such as decoding, dequantization, inverse transformation, and reconstruction, to generate output data that represents the source data. To reconstruct the data, the decoder 110 may perform prediction in a similar manner as the encoder 105 performs prediction. For example, the decoder 110, predicts a first decoded value (sp0) using previously-predicted values (sb, sc, sd, se) (FIG. 6A). The decoder 110 may further correct the first decoded value (sp0) according to a transform coefficient to increase the accuracy of the output data. The decoder 110 then replaces the first predicted value (sp0) with a first decoded pixel data (sd0), and the decoder 110 then predicts a second predicted value (e.g., sp1) using the first decoded pixel data (sd0) and previously-predicted values (e.g., sa, sb) (FIG. 6B). The decoder 110 then predicts a third predicted value (e.g., sp2) using previously-predicted values (e.g., sd, se, sf) and the first decoded pixel data (sd0) (FIG. 6C). The decoder 110 then replaces the second predicted value (sp1) and the third predicted value (sp2) with a second decoded pixel data (sd1) and a third decoded pixel data (sd2), respectively. The decoder 110 then predicts a fourth decoded value (e.g., sp3) using only the decoded pixel data (e.g., sd0, sd1, sd2) (FIG. 6D).

In the foregoing description, the technology has been described with reference to specific exemplary embodiments. The particular implementations shown and described are illustrative of the technology and its best mode and are not intended to otherwise limit the scope of the present technology in any way. Indeed, for the sake of brevity, conventional manufacturing, connection, preparation, and other functional aspects of the method and system may not be described in detail. Furthermore, the connecting lines shown in the various figures are intended to represent exemplary functional relationships and/or steps between the various elements. Many alternative or additional functional relationships or physical connections may be present in a practical system.

The technology has been described with reference to specific exemplary embodiments. Various modifications and changes, however, may be made without departing from the scope of the present technology. The description and figures are to be regarded in an illustrative manner, rather than a restrictive one and all such modifications are intended to be included within the scope of the present technology. Accordingly, the scope of the technology should be determined by the generic embodiments described and their legal equivalents rather than by merely the specific examples described above. For example, the steps recited in any method or process embodiment may be executed in any order, unless otherwise expressly specified, and are not limited to the explicit order presented in the specific examples. Additionally, the components and/or elements recited in any apparatus embodiment may be assembled or otherwise operationally configured in a variety of permutations to produce substantially the same result as the present technology and are accordingly not limited to the specific configuration recited in the specific examples.

Benefits, other advantages and solutions to problems have been described above with regard to particular embodiments. Any benefit, advantage, solution to problems or any element that may cause any particular benefit, advantage or solution to occur or to become more pronounced, however, is not to be construed as a critical, required or essential feature or component.

The terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same.

The present technology has been described above with reference to an exemplary embodiment. However, changes and modifications may be made to the exemplary embodiment without departing from the scope of the present technology. These and other changes or modifications are intended to be included within the scope of the present technology, as expressed in the following claims.

The invention claimed is:

1. An apparatus for performing intra block prediction on a frame of image data, comprising:
    a block generator configured to receive the frame of image data and divide the frame of image data into a plurality of blocks, wherein each block comprises a plurality of sub-blocks; and
    an encoder connected to the block generator and configured to:
        determine a first predicted pixel value for a first sub-block at a first location using only a previously-encoded sub-block;
        replacing the first predicted value of the first sub-block with a replica value;
        determine a second predicted pixel value for a second sub-block at a second location using the previously-encoded sub-block and the replica value;
        wherein the first sub-block and the second sub-block are from a same block; and
        compute a first difference encoded value using a first original, not-yet-encoded pixel value and the first predicted pixel value.

2. The apparatus according to claim 1, wherein the first predicted pixel value and the first original, not-yet-encoded pixel value have a same coordinate location within the frame of image data.

3. The apparatus according to claim 1, wherein the encoder comprises a matching decoder configured to perform dequantization and inverse transformation to generate the replica value.

4. The apparatus according to claim 1, wherein the encoder further comprises:
    a prediction module;
    a transform module connected to an output terminal of the prediction module; and a quantizer connected to an output terminal of the transform module; and a matching decoder connected between an output terminal of the quantizer and an input terminal of the prediction module.

5. The apparatus according to claim 1, wherein the previously-encoded sub-block is directly adjacent to the first location and the second location.

6. The apparatus according to claim 1, wherein the encoder comprises:

a prediction module comprising:
  a first input terminal to receive the plurality of blocks; and
  a second input terminal;
a transform module connected to an output terminal of the prediction module, and
a quantizer connected to an output terminal of the transform module and the second input terminal of the prediction module, wherein the quantizer transmits a transform coefficient to the prediction module.

7. The apparatus according to claim 1, wherein the previously-predicted sub-block comprises a previously-encoded value.

8. The apparatus according to claim 1, wherein the encoder generates a compressed bitstream according to the first difference encoded value and transmits the compressed bitstream to a decoder.

9. The apparatus according to claim 1, wherein the block generator transmits the original, not-yet encoded pixel value from an image sensor.

10. A method for performing intra block prediction, comprising:

generating a frame of image data comprising a plurality of pixel values;
generating a predicted block comprising:
  generating a first predicted value for a first sub-block at a first location using only a previously predicted sub-block;
  replacing the first predicted value of the first sub-block with a replica value; and
  generating a second predicted value for a second sub-block at a second location using the previously-predicted sub-block and the replica value;
    wherein the second sub-block is directly adjacent to the first sub-block; and
computing a difference value using the first predicted value and a first original, not-yet-encoded value from the plurality of pixel values.

11. The method according to claim 10, wherein the first predicted pixel value and the first original, not-yet-encoded pixel value have a same coordinate location within the frame of image data.

12. The method according to claim 10, wherein the previously-predicted sub-block comprises a previously-encoded value and is directly adjacent to the first and second locations.

13. The method according to claim 10, further comprising:

generating a plurality of transformed coefficients by transforming the predicted block using a transform algorithm;
generating a plurality of quantized coefficient by quantizing the plurality of transformed coefficients;
encoding the plurality of quantized coefficients; and
outputting a compressed bitstream.

14. The method according to claim 10, further comprising:

generating a dequantized value by dequantizing the plurality of quantized coefficients; and
generating an inverse transformed value by applying an inverse transform algorithm to the dequantized value.

15. A system, comprising:

an image sensor configured to generate a frame of image data;
a block generator connected to the image sensor and configured to receive the frame of image data and divide the frame of image data into a plurality of blocks, wherein each block comprises a plurality of sub-blocks;
an encoder configured to:
  generate a predicted block, comprising:
    determining a first predicted pixel value for a first sub-block at a first location using only a first previously-predicted sub-block;
    replacing the first predicted pixel value of the first sub-block with a first replica value; and
    determining a second predicted pixel value for a second sub-block at a second location using the first previously-predicted sub-block and the first replica value; wherein the second sub-block is directly adjacent to the first sub-block; and
    computing a difference value using the second predicted pixel value and an original, not-yet-encoded pixel value from the frame of image data; and
  generate a compressed bitstream according to the predicted block;
a decoder configured to:
  receive the compressed bitstream; and
  reconstruct the frame of image data using the compressed bitstream, comprising:
    determining a third predicted pixel value using only a second previously-predicted sub-block; and
    determining a fourth predicted pixel value using the second previously-predicted sub-block and a decoded value; wherein the fourth predicted pixel value is directly adjacent to the third predicted pixel value.

16. The system according to claim 15, wherein the encoder comprises a matching decoder configured to perform dequantization and inverse transformation to generate the first replica value.

17. The system according to claim 15, wherein the encoder further comprises:

a prediction module;
a transform module connected to an output terminal of the prediction module; and
a quantizer connected to an output terminal of the transform module; and
a matching decoder connected between an output terminal of the quantizer and an input terminal of the prediction module.

18. The system according to claim 15, wherein the first predicted pixel value and the first original, not-yet-encoded pixel value have a same coordinate location within the frame of image data.

19. The system according to claim 15, wherein the first previously-predicted sub-block comprises a previously-encoded value and is directly adjacent to the first and second locations.

20. The system according to claim 15, wherein the decoder further corrects the third predicted pixel value according to a transform coefficient.

* * * * *